US011159679B2

(12) United States Patent
Ding et al.

(10) Patent No.: US 11,159,679 B2
(45) Date of Patent: Oct. 26, 2021

(54) AUTOMATED SYSTEMS AND METHODS FOR NATURAL LANGUAGE PROCESSING WITH SPEAKER INTENTION INFERENCE

(71) Applicant: Cigna Taiwan Life Assurance Co. Ltd., Taipei (TW)

(72) Inventors: Joshua Chihsong Ding, Taipei (TW); Cheng Chi Tien, New Taipei (TW); Hui Hsin Hsiao, Taipei (TW); Chia Ling Tu, Taipei (TW)

(73) Assignee: Cigna Taiwan Life Assurance Co. Ltd., Taipei (TW)

( * ) Notice: Subject to any disclaimer, the term of this patent is extended or adjusted under 35 U.S.C. 154(b) by 38 days.

(21) Appl. No.: 16/802,307

(22) Filed: Feb. 26, 2020

(65) Prior Publication Data
US 2020/0274970 A1 Aug. 27, 2020

Related U.S. Application Data

(60) Provisional application No. 62/810,951, filed on Feb. 26, 2019.

(51) Int. Cl.
*H04M 3/00* (2006.01)
*H04M 3/51* (2006.01)
(Continued)

(52) U.S. Cl.
CPC ............ *H04M 3/5166* (2013.01); *G06N 5/04* (2013.01); *G06N 20/00* (2019.01);
(Continued)

(58) Field of Classification Search
CPC ............ H04M 3/5166; H04M 3/5158; H04M 2201/39; H04M 2201/40; G06N 20/00;
(Continued)

(56) References Cited

U.S. PATENT DOCUMENTS

| 7,516,088 B2 | 4/2009 | Johnson |
| 8,019,649 B2 | 9/2011 | Roeser |

(Continued)

FOREIGN PATENT DOCUMENTS

| CN | 107103083 A | 8/2017 |
| CN | 108521525 A | 9/2018 |

(Continued)

*Primary Examiner* — William J Deane, Jr.
(74) *Attorney, Agent, or Firm* — Harness, Dickey & Pierce, PLC

(57) ABSTRACT

A computerized method of managing a robotic telemarketing call includes calling, by an automated robotic telemarketing system, a customer selected from a customer list. The method includes parsing, by a real-time speech recognition module of the automated robotic telemarketing system, a customer statement received from the customer. The method includes determining, by a language intention determining module, a customer purchase intention according to the parsed customer statement. The method includes selecting a sales pitch response corresponding to the determined customer purchase intention. The method includes providing an audio signal including the selected sales pitch response to the customer.

21 Claims, 5 Drawing Sheets

(51) Int. Cl.
    *G06Q 30/00*     (2012.01)
    *G06Q 10/06*     (2012.01)
    *G06N 5/04*     (2006.01)
    *G10L 15/18*     (2013.01)
    *G06N 20/00*     (2019.01)

(52) U.S. Cl.
    CPC ..... *G06Q 10/06311* (2013.01); *G06Q 30/016* (2013.01); *G10L 15/1822* (2013.01); *H04M 3/5158* (2013.01); *H04M 2201/39* (2013.01); *H04M 2201/40* (2013.01)

(58) Field of Classification Search
    CPC ............ G06Q 10/06311; G06Q 30/016; G10L 15/1822
    USPC ....... 379/266.01–266.1, 265.01–265.14, 309
    See application file for complete search history.

(56) References Cited

U.S. PATENT DOCUMENTS

| | | | |
|---|---|---|---|
| 8,045,699 B2 | 10/2011 | Anderson | |
| 8,271,355 B2 | 9/2012 | Johnson | |
| 8,560,321 B1 | 10/2013 | Yeracaris | |
| 8,755,511 B2 | 6/2014 | Duva | |
| 8,811,592 B1* | 8/2014 | Pettay | G10L 15/08 379/265.06 |
| 8,989,370 B1* | 3/2015 | Howell | H04M 3/5158 379/266.07 |
| 9,230,387 B2 | 1/2016 | Stiernagle | |
| 10,423,969 B2 | 9/2019 | Tivey | |
| 10,567,314 B1* | 2/2020 | Chang | H04N 7/155 |
| 2004/0148218 A1 | 7/2004 | Bovee | |
| 2004/0193503 A1 | 9/2004 | Eder | |
| 2009/0006151 A1 | 1/2009 | Zarghami | |
| 2009/0043614 A1* | 2/2009 | Yee | G06Q 40/02 705/4 |
| 2011/0255673 A1* | 10/2011 | Baker | H04M 1/642 379/88.23 |
| 2014/0122178 A1 | 5/2014 | Knight | |
| 2014/0314225 A1 | 10/2014 | Riahi | |
| 2014/0314255 A1 | 10/2014 | Fukuoka | |
| 2015/0201077 A1 | 7/2015 | Konig | |
| 2017/0125008 A1 | 5/2017 | Maisonnier | |
| 2018/0173999 A1* | 6/2018 | Renard | G06K 9/6256 |

FOREIGN PATENT DOCUMENTS

| | | |
|---|---|---|
| CN | 109005276 A | 12/2018 |
| TW | 201903625 A | 1/2019 |

\* cited by examiner

AUTOMATED SYSTEMS AND METHODS FOR NATURAL LANGUAGE PROCESSING WITH SPEAKER INTENTION INFERENCE

CROSS-REFERENCE TO RELATED APPLICATIONS

This application claims the benefit of U.S. Provisional Application No. 62/810,951 filed Feb. 26, 2019, the entire disclosure of which is hereby incorporated by reference. This application claims priority to Taiwanese Patent Application No. 108117355 filed May 20, 2019 and attached as Appendix A, the entire disclosure of which is hereby incorporated by reference.

FIELD

The present disclosure relates to natural language processing and automated voice interaction systems and more particularly to systems and methods with speaker intention inference.

BACKGROUND

Existing telemarketing approaches rely heavily on human telemarketers to sell products. The telemarketers typically contact customers one by one using a customer list stored in a database, are often questioned or rejected by customers during the call, and have to spend a lot of time answering customer questions and describing features of the products to increase a customer's intention to purchase a product. An experienced telemarketer can communicate with customers to understand their needs and the best insurance products for the customer, and is thus more likely to complete a sale of an insurance policy over the phone. However, it is difficult for a telemarketer to become highly tolerant of normal telemarketing frustrations and good at sales pitches under the telemarketing laws, as well as becoming familiar with insurance products and life insurance certificates.

Telemarketing robots are expected to reduce the aforementioned burden of telemarketers, however the core technology has not been developed yet. Most of the existing telemarketing robots can merely carry out automatically dialing, or judge whether a consumer is willing to purchase products during a call, and therefore cannot replace conventional human telemarketers.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A computerized method of managing a robotic telemarketing call includes calling, by an automated robotic telemarketing system, a customer selected from a customer list, parsing, by a real-time speech recognition module of the automated robotic telemarketing system, a customer statement received from the customer, determining, by a language intention determining module, a customer purchase intention according to the parsed customer statement, selecting a sales pitch response corresponding to the determined customer purchase intention, and providing an audio signal including the selected sales pitch response to the customer.

In other features, calling includes obtaining, by a customer list management module, a phone number of the selected customer from the customer list managed by the customer list management module. In other features, determining the customer purchase intention includes determining the customer purchase intention using keyword matching.

In other features, the keyword matching includes mapping each parsed word in the customer statement to a label, and applying one or more business rules to the labeled words to determine the customer purchase intention and an accuracy of the customer purchase intention. In other features, determining the customer purchase intention includes determining the customer purchase intention using natural language processing.

In other features, wherein providing the audio signal to the customer includes at least one of obtaining a pre-recorded audio signal of the selected response, and converting the selected response into the audio signal using computer voice synthesis. In other features, determining a customer purchase intention includes classifying the customer purchase intention as a positive response or a negative response. In other features, selecting the sales pitch response includes selecting a sales pitch response that corresponds to the classified positive response or selecting a sales pitch response that corresponds to the classified negative response.

In other features, the method includes training an optimal sales pitch model to select the sales pitch response corresponding to the determined customer purchase intention by obtaining multiple historical sales calls, separating the obtained calls into multiple datasets according to attributes of the obtained calls, for each dataset, generating a word-vector matrix based on word frequency in the obtained calls, and assigning a label to each word or cluster of words, and training a machine-learning model for each dataset using the generated word-vector matrix, word or cluster labels, and/or determined response success rates of the obtained calls. In other features, the method includes determining, based on the parsed customer statement, whether to end the call or transfer the call to a salesperson.

A computer system includes memory and a processor. The memory is configured to store a customer list and computer-executable instructions, the customer list including phone numbers for multiple potential telemarketing customers. The instructions include calling one of the customers selected from the customer list, parsing, by a real-time speech recognition module, a customer statement received from the customer, determining, by a language intention determining module, a customer purchase intention according to the parsed customer statement, selecting a sales pitch response corresponding to the determined customer purchase intention, and providing an audio signal including the selected sales pitch response to the customer.

In other features, calling includes obtaining, by a customer list management module, the phone number of the selected customer from the customer list managed by the customer list management module. In other features, determining the customer purchase intention includes determining the customer purchase intention using keyword matching.

In other features, the keyword matching includes mapping each parsed word in the customer statement to a label, and applying one or more business rules to the labeled words to determine the customer purchase intention and an accuracy of the customer purchase intention. In other features, determining the customer purchase intention includes determining the customer purchase intention using natural language processing.

In other features, providing the audio signal to the customer includes at least one of obtaining a pre-recorded audio signal of the selected response, and converting the selected response into the audio signal using computer voice synthesis. In other features, determining a customer purchase intention includes classifying the customer purchase intention as a positive response or a negative response. In other features, selecting the sales pitch response includes selecting a sales pitch response that corresponds to the classified positive response or selecting a sales pitch response that corresponds to the classified negative response.

In other features, the instructions include training an optimal sales pitch model to select the sales pitch response corresponding to the determined customer purchase intention by obtaining multiple historical sales calls, separating the obtained calls into multiple datasets according to attributes of the obtained calls, for each dataset, generating a word-vector matrix based on word frequency in the obtained calls, and assigning a label to each word or cluster of words, and training a machine-learning model for each dataset using the generated word-vector matrix, word or cluster labels, and/or determined response success rates of the obtained calls. In other features, the instructions include determining, based on the parsed customer statement, whether to end the call or transfer the call to a salesperson.

Further areas of applicability of the present disclosure will become apparent from the detailed description, the claims, and the drawings. The detailed description and specific examples are intended for purposes of illustration only and are not intended to limit the scope of the disclosure.

DETAILED DESCRIPTION

Figure 1:
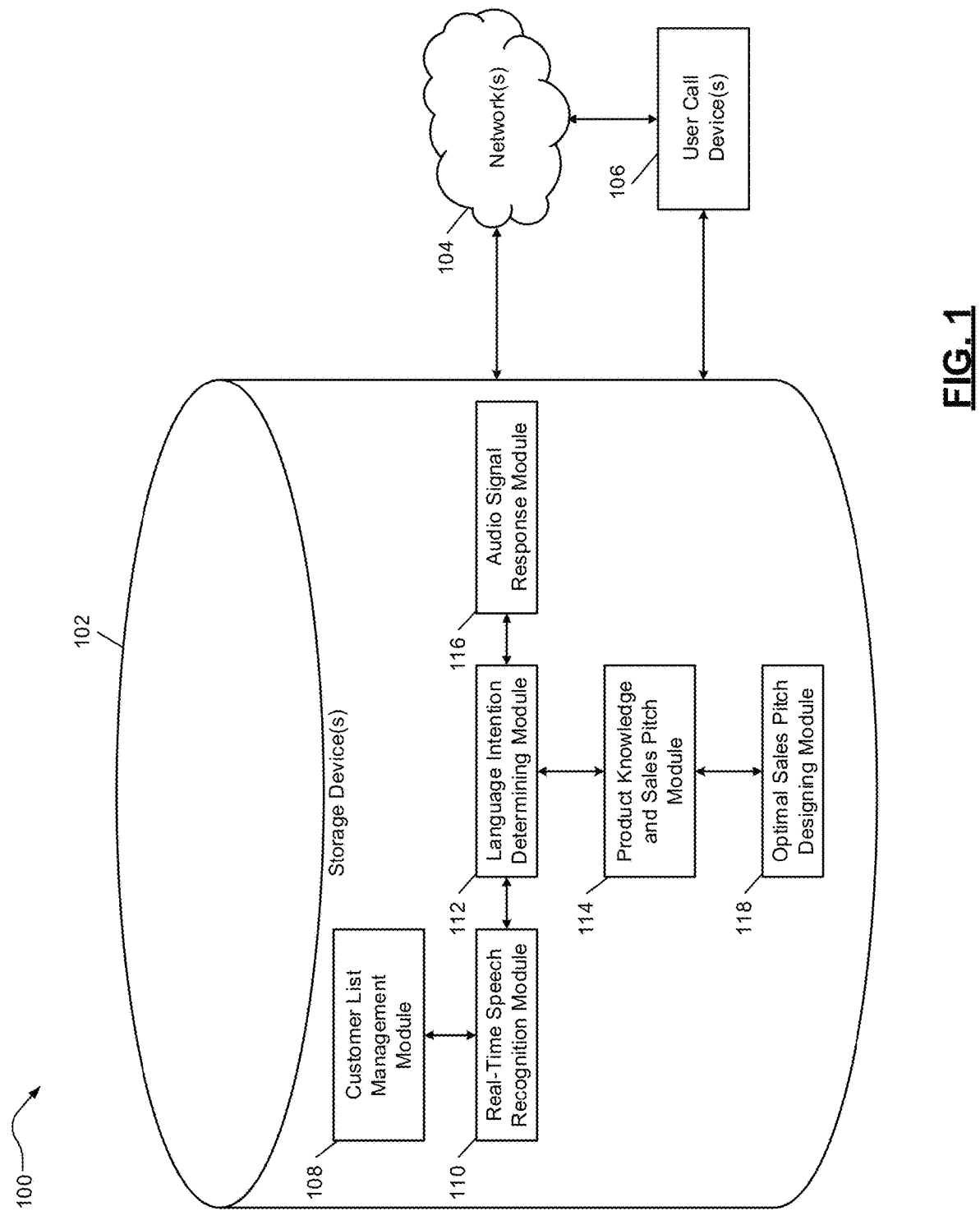
FIG. 1 is a functional block diagram of an example system for managing robotic telemarketing.

Human telemarketers may incur considerable costs for enterprises, as the telemarketers contact customers one by one to determine the purchase intention of each customer during each call. According to some aspects of the present disclosure, a robotic telemarketing system and method uses artificial intelligence to aid or replace human telemarketers. The robotic telemarketing system may use optimized sales pitch responses to increase a customer's purchase intention during a call, and may have an increased potential to replace human telemarketers.

For example, in various implementations the robotic telemarketing system includes a telephone device and a computer device in communication with the telephone device. The telephone device may be configured to perform speech communication with a called customer (e.g., to receive speech from a called customer and to transmit speech to the called customer). The computer device may include, for example, a speech-to-text module, a conversation module, a text-to-speech module, etc. The speech-to-text module may be configured to convert the speech of the called customer into called-party text, the conversation module may be configured to determine and generate a text response to the called-party text, and the text-to-speech module may be configured to convert the text response into a speech response, so that the telephone device transmits the speech response to the called party.

A conversation module may be constructed according to various machine learning algorithms, to generate text responses that are likely to increase a customer's purchase intention. For example, a telemarketing robot system may use artificial intelligence to make product recommendations during a telemarketing call. The system may, via configured audio signals, perform an opening conversation, answer customers' questions, describe features of products, inquire about customers' purchase intentions, design sales pitches intended to increase customers' purchase intentions, etc. The system may transfer the called party to a human for subsequent conversations during the call in real time, or end the call, according to the customers' responses during the call.

Various implementations described herein may address technical problems of conventional telemarketing systems that are unable to parse text of converted customer speech in real-time during a call, are unable to process the speech to determine customer intention probabilities, are unable to provide automated responses that correspond to determined intention probabilities, etc. For example, technical solutions described herein may provide parsing of converted customer speech in real time during a call, may use natural language processing (NLP) analysis and/or keyword mapping on the parsed speech to calculate intention probabilities, may use machine learning models to provide responsive statements in real time during the call that are optimized to increase purchase probabilities, etc.

Robotic Telemarketing System

FIG. 1 is a block diagram of an example implementation of a system 100 for managing robotic telemarketing calls, including a storage device 102. While the storage device 102 is generally described as being deployed in a managed computer network system (for example, a company computer network managed by an IT manager, etc.), the storage device 102 and/or components of the storage device 102 may otherwise be deployed (for example, as a standalone computer setup, etc.). The storage device 102 may be a desktop computer, a laptop computer, a tablet, a smartphone, etc.

As shown in FIG. 1, the storage device 102 includes a customer list management module 108, a real-time speech recognition module 110, a language intention determining module 112, a product knowledge and sales pitch module 114, an audio signal response module 116, and an optimal sales pitch designing module 118. The customer list management module 108, real-time speech recognition module 110, language intention determining module 112, product knowledge and sales pitch module 114, audio signal response module 116, and optimal sales pitch designing module 118 may be located in different physical memories within the storage device 102, such as different random access memory (RAM), read-only memory (ROM), a non-volatile hard disk or flash memory, etc. In some implementations, one or more of the customer list management module 108, real-time speech recognition module 110, language intention determining module 112, product knowledge and sales pitch module 114, audio signal response module 116, and optimal sales pitch designing module 118 may be located in the same memory (e.g., in different address ranges of the same memory, etc.).

The customer list management module 108 may perform any suitable functions for managing lists of customers to be called by the system 100, such as managing marketing activities, storing customer lists, storing customer attributes and customers' phone numbers, setting expiration dates of lists, setting contents of products for sale, assigning the lists for conducting telemarketing calls, etc.

The real-time speech recognition module 110 (e.g., a speech-to-text module, etc.), may translate conversation speech between a customer and a telemarketer (e.g., a robotic telemarketer) over the phone into conversation text in a real-time recognition manner through, for example, a speech recognition engine connected to a telecommunication switch system. The language intention determining module 112 (sometimes referred to as a conversation module), may use keyword matching, artificial intelligence natural language analysis (NLP), etc., to analyze the conversation text generated by the speech recognition module 110 in real time, and classify customer intentions according to customer response terms.

The product knowledge and sales pitch module 114 (which may also be considered as part of a general conversation module), may store professional information about products for sale, such as the characteristics of the products, instructions for policy service (for example, the procedures of payments and insurance claims), insurance terminology, etc., in a database in a predefined data format. In conjunction with the optimal sales pitch designing module 118, the product knowledge and sales pitch module 114 may assign optimal corresponding responses for different customer attributes and intentions. A customer's question may be answered by the language intention determining module 112 and the product knowledge and sales pitch module 114 together, when the language intention determining module 112 identifies a specific question through analysis of a customer response.

The audio signal response module (e.g., a text-to-speech module, etc.), may convert the text content generated by the optimal sales pitch designing module 118 into an audio signal, to respond to customers in real-time through pre-recorded audio files, synthetic speech generated by computer voice synthesis technology, etc. The speech may be generated in any suitable language and with any suitable accent, such as Taiwanese-accent speech generated by the computer voice synthesis technology, etc.

The optimal sales pitch designing module 118 (which may also be considered as part of the general conversation module), may analyze the content of sale calls with natural language analysis technologies to extract an optimal prologue to increase the chances of a sale based on the analyzed content of the call, determine a most appropriate number of customer intention classifications using one or more algorithms, develop most appropriate response words based on different customer attributes for each customer's determined intention, disclose necessary sale information to customers under applicable laws and standards, avoid inappropriate sale words to ensure a customer's rights and improve the sale call quality, etc.

As described above, the robotic telemarketing system 100 may obtain a large number of customer lists stored in a marketing database, use a sales pitch extracted by the optimal sales pitch designing module 118, and perform audio interactions with customers in real time using the real-time speech recognition module 110, the language intention determining module 112, and the audio signal response module 116. For example, the system 100 may establish a telemarketing call with a user call device 106, based on numbers from a customer list, etc. The call may be established via one or more networks 104, such as a cellular network, a landline telephonic network, a wireless network, a local area network (LAN), the Internet, etc. The system 100 may set different sales pitches according to different customer's attributes, and transfer the current call to a human telemarketer for subsequent processing after increasing the current customer's purchase intention, to improve the performance of the telemarketing system 100.

Robotic Telemarketing Call Process

Figure 2:
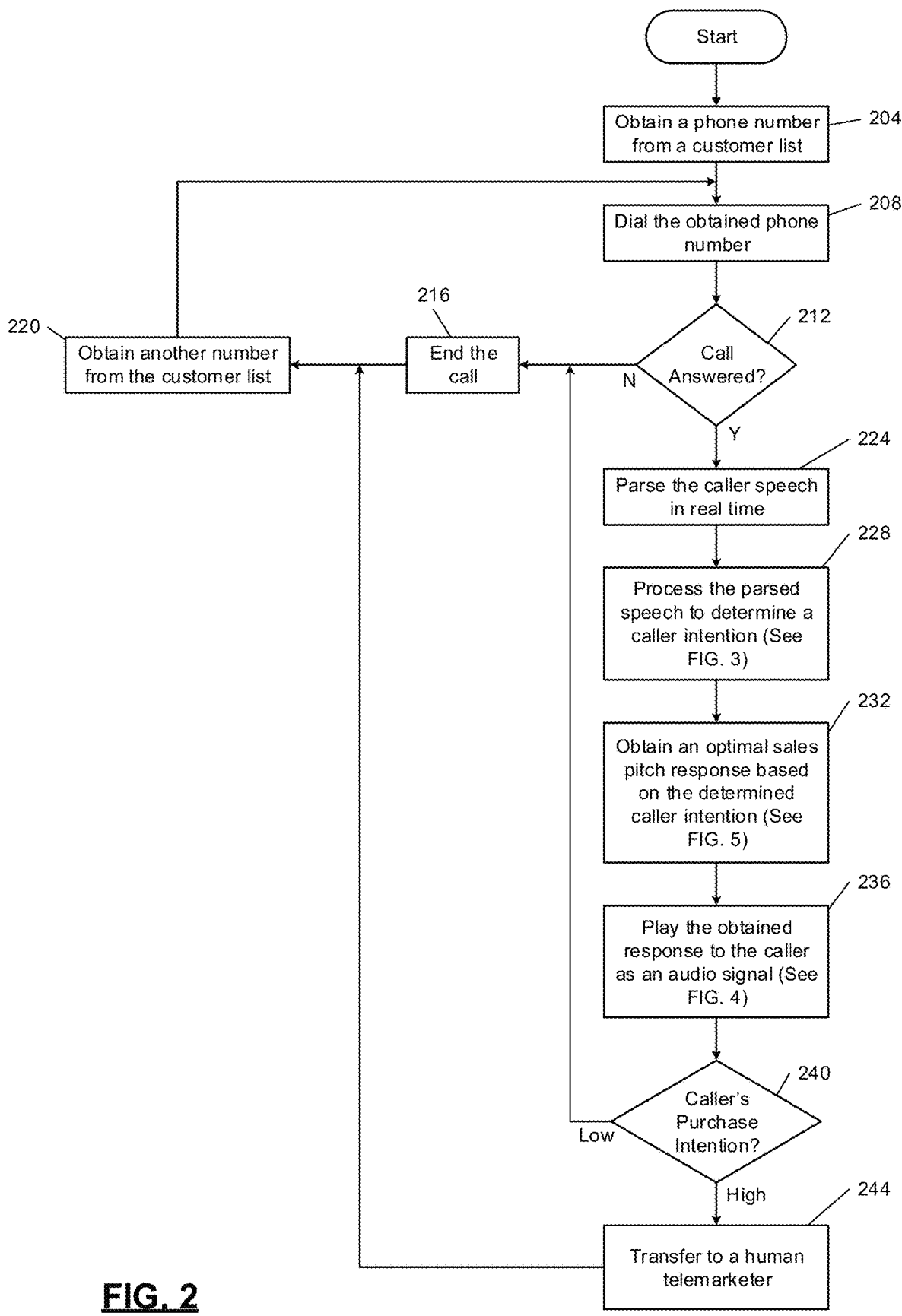
FIG. 2 is a flowchart depicting an example method for managing a robotic telemarketing call using the system of FIG. 1.

FIG. 2 illustrates an example process for performing a robotic telemarketing call using the system 200. At 204, control begins by obtaining a phone number from a customer list. For example, the customer list management module 108 may be configured to allow users to import lists of marketing activities, store customer names, store customer phone numbers, store attributes (e.g., age, gender, etc.), set a start to end time period for marketing activities, set an expiration for each list and the list of products on sale, manage account login authority, define supervisors and their telemarketers, assign each customer list to telemarketer(s) responsible for the list according to instructions of the supervisors, etc.

After a telemarketer logs in to the system, the telemarketer may use the assigned customer list to make a phone call manually, through an automated dialing system, etc. For example, at 208, control may automatically dial a phone number obtained from the list. If no one answers the call at 212, the call will end at 216. However, if someone answers the call at 212, control proceeds to 224 to parse the caller speech in real time (e.g., via the real-time speech recognition module 110).

For example, the real-time recognition module 110 may receive an audio signal via a computer-telephone integration system, an interactive speech system, etc., and generate conversation text data corresponding to the audio signal in real time. The real-time speech recognition module 110 may store the audio signal data in a recording system, transmit the conversation text data to the language intention determining module 112, store the conversation text data in a database, etc.

Control then proceeds to 228 to process the parsed speech to determine a caller intention. For example, and as described further below with reference to FIG. 3, the language intention determining module 112 may use keyword searching and matching, natural language processing (NLP), a combination of keywords and NLP, etc., to determine a customer's intention based on the customer response data from the real-time speech recognition module 110.

At 232, control obtains an optimal sales pitch response based on the determined caller's intention. For example, and as described further below with reference to FIG. 5, the optimal sales pitch designing module 118 may determine an optimal sales pitch that is most likely to lead to a customer purchase, based on the customer intention determined by the language intention determining module 112.

Control proceeds to play the obtained sales pitch response to the caller as an audio signal at 236. For example, and further explained below with reference to FIG. 4, the audio signal response module 116 may convert the sales pitch response from the optimal sales pitch designing module 118 into an audio signal, using a pre-recorded audio file, voice synthesis technology, etc.

At 240, control determines a caller's purchase intention in response to the optimal sales pitch response that was played to the caller at 236. For example, the language intention determining module 312 may be used to determine the customer's purchase intention after the optimal sales pitch response is delivered to the customer. If the customer is determined at 240 to have a low intention of purchasing a product in response to delivery of the optimal sales pitch (e.g., a likelihood percentage below a specified threshold based on predictive analysis, historical response data, etc.), the call may be ended at 216. If the customer is determined to have a high intention to purchase a product at 240, control may proceed to transfer the call to a human telemarketer at 244 (e.g., to close the deal, etc.).

After a call is ended at 216 (because a call was not answered at 212 or the customer's purchase intention was determined to be low at 240), or a call is transferred to a human telemarketer at 244, control may obtain another number from the customer list at 220. Control then proceeds to dial the newly obtained number at 208, to restart the process for another potential customer.

Determining Caller Intention

Figure 3:
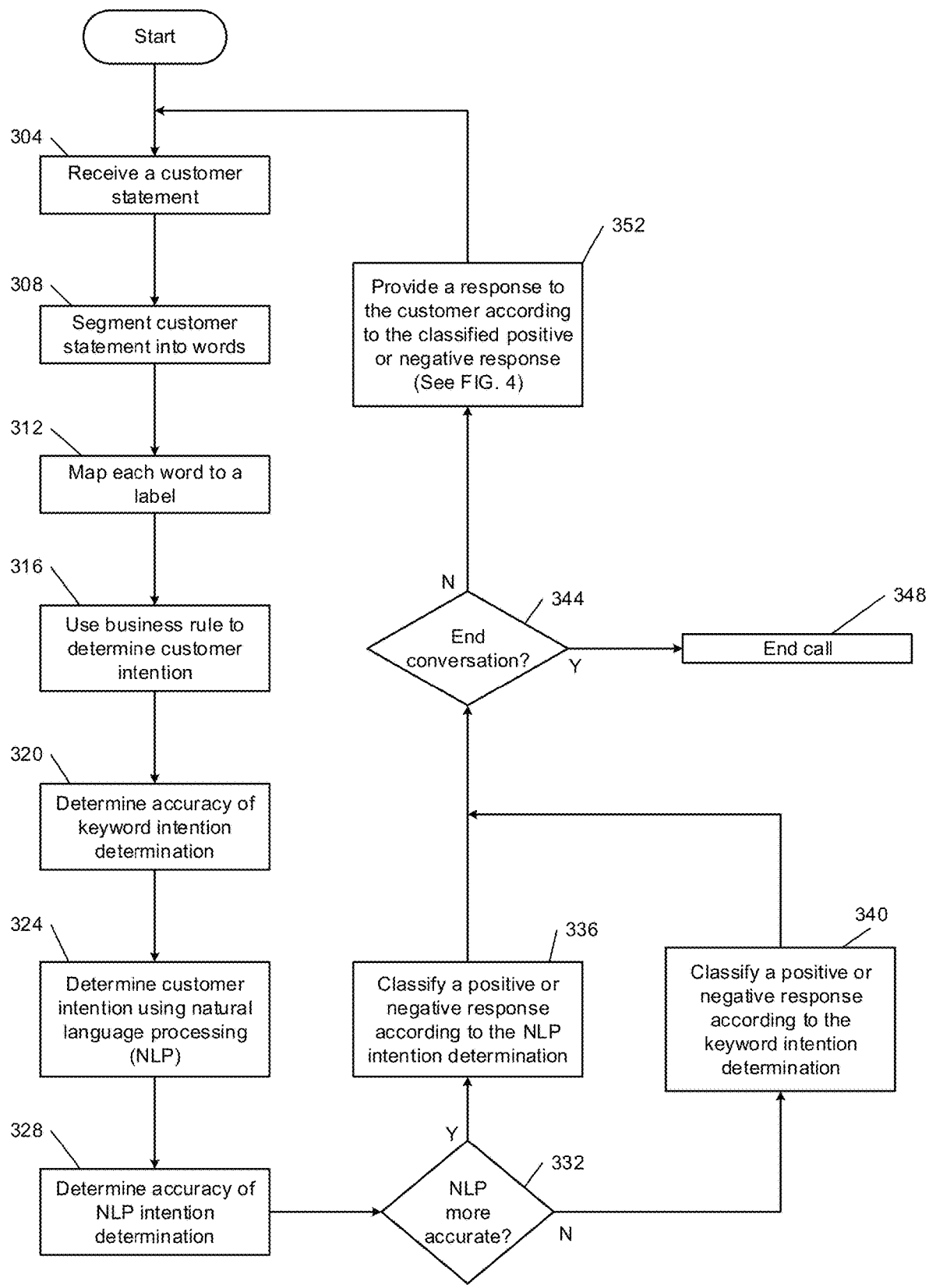
FIG. 3 is a flowchart depicting an example method for determining a customer purchase intention during a robotic telemarketing call.

FIG. 3 illustrates an example process for determining a caller's intention. At 304, control receives a customer statement, such as a customer answering a call or responding to audio delivered by the audio signal response module 116. The customer statement may be received from the real-time language speech recognition module 110, and the process illustrated in FIG. 3 may be performed by the language intention determining module 112.

At 308, the customer is segmented (e.g., parsed) into individual words and/or phrases. For example, keyword searching and matching may be performed using a text search and logical determination to obtain a classification result of a current call. Multiple keyword logical combination (e.g., AND, OR, etc.) may be used, and for more precise determination, the classification may take into account parameters associated with distances between keyword sets. As an example, the phrase "I am driving" may be separated into an individual word order: (1) "I"; (2) "am"; (3) "driving". A customer phrase "I am not interested" may be separated into an individual word order: (1) "I"; (2) "am"; (3) "not"; (4) "interested".

Each word or phrase is mapped to a label at 312. For example, word tokenization may be used where words like "I" and "My" are mapped with a "Customer" label, words like "am" and "are" are mapped with an "Auxiliary verb" label, words like "driving" and "sleeping" are mapped with a "Not okay to talk" label, phrases like "Not interested" and "Don't need" are mapped with a "Quick rejection" label, etc. Using the first example above, the customer statement "I am driving" may be ordered as: (1) "I"—Customer; (2) "am"—Auxiliary verb; (3) "driving"—Not okay to talk.

At 316, control uses one or more business rules on the segmented and labeled statement to determine a customer's intention. The business rules may ignore terms with certain labels, predict customer intentions based on label combinations in a phrase, provide an accuracy rate for predicted customer intentions based on the labels, etc. Using the first example above, a business rule may first ignore any "Auxiliary verb" labeled terms, so the customer statement is reduced to (1)—Customer; (2)—Not okay to talk. Another business rule may indicate that the label "Customer" followed by the label "Not okay to talk" predicts a negative response customer intention with an accuracy rate of 86.7%. As another example, a business rule may indicate that a label "Customer" followed by a label "Quick rejection" may predict a negative response customer intention with an accuracy rate of 91.3%.

These word mapping tables and business rules may be developed using any suitable predicative modeling techniques, such as analyzing historical call data, building machine learning models, etc. For example, a word mapping table may be generated by detecting and collecting negative responses, positive responses, etc., from historical call data. Negative calls may be identified using any suitable criteria, such as short talk times (e.g., calls less than a specified time period such as thirty seconds, one minute, ninety seconds, etc.), absence of any follow up calls, customer complaint calls that are detected by a human, etc.

Word segmentation and tokenization may be performed to ignore unimportant words, redundant words, etc. The output of the word segmentation and tokenization may be used as training data to build a word clustering table. The word clustering table may be built using an algorithm that groups all words having similar meanings into a same cluster. For example, words like "I", "You" and "He" may be grouped in one cluster, words like "busy", "cooking", "meeting" and "driving" may be grouped in a second cluster, etc. A user may then identify a meaning of each cluster and assign a label to the cluster. The user may input specific words to enhance the word mapping table. This can provide flexibility and allows for targeting of critical sensitive terms, such as "I will contact the financial supervisory commission" or another government bureau depending on the industry.

At 324, control determines the accuracy of the keyword intention determination. For example, as described above, one or more business rules may be used to determine an accuracy of the customer intention determination generated at 320. Control then proceeds to 324 to determine the customer intention using natural language processing (NLP).

A natural language processing (NLP) algorithm may use a whole text signal (e.g., a customer's response) as model input data, and use a word embedding technology to split words (e.g., Chinese words or any other suitable language). After segmenting the words, word combinations may be input to a natural language analysis algorithm (e.g., a neural network algorithm such as RNN, LSTM, etc.), in order to obtain a classification result of the current call. Step 324 may perform its own word segmentation and/or may use the word segmentation that was previously performed at 308.

Similar to the keyword intention determination, the NLP intention determination may provide an accuracy rate using the NLP model at 328. The accuracy rate may be based on the content of the customer statement that was processed by the NLP model, etc. For example, the NLP model may determine that a customer statement falling under the scenario "Customer is busy" may be predicted as a negative response customer intention with an accuracy rate of 82.7%, a customer statement falling under the scenario "Customer is willing to listen" may predict a positive response customer intention with an accuracy rate of 91.5%, etc.

At 332, control determines whether the NLP intention determination has a higher accuracy rate than the keyword intention determination. If so, control classifies the customer statement as a positive or negative response according to the NLP intention determination, at 336. If the NLP intention determination has a lower accuracy rate, control classifies the customer statement as a positive or negative response according to the keyword intention determination, at 340.

Figure 4:
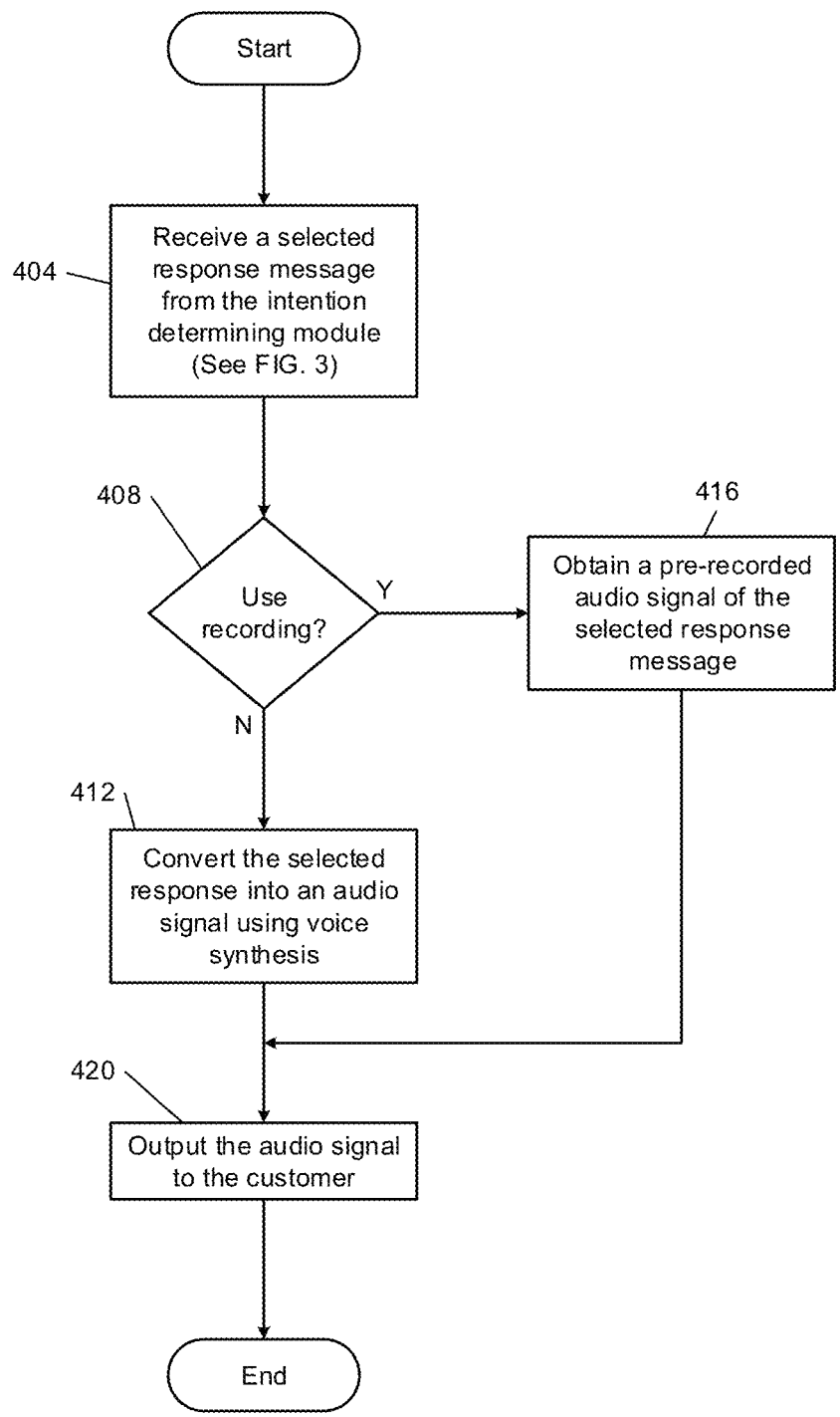
FIG. 4 is a flowchart depicting an example method for providing a selected response to a customer during a robotic telemarketing call.
Figure 5:
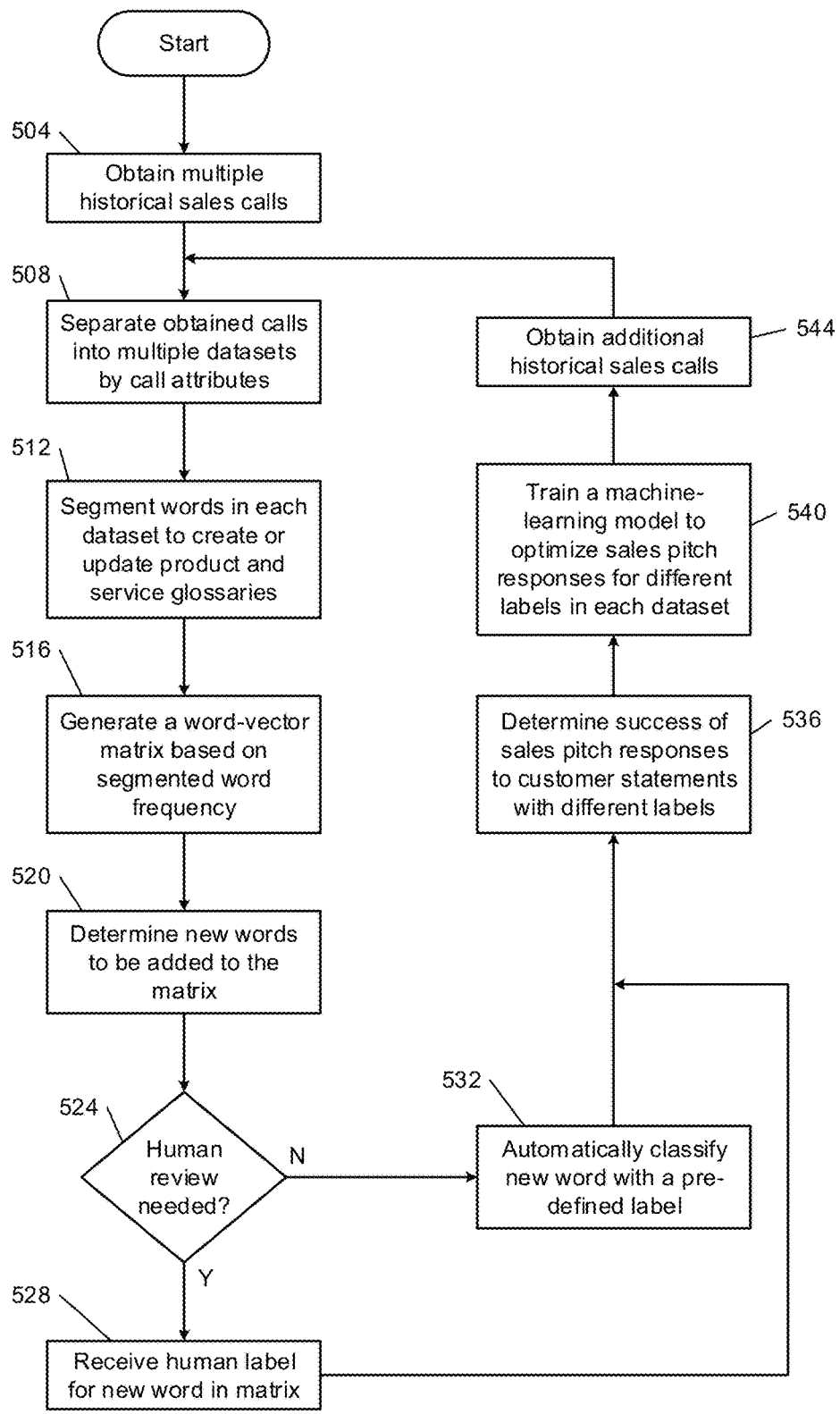
FIG. 5 is a flowchart depicting an example method developing and training an optimal sales pitch model using historical call data.

After classifying the customer statement, control determines whether to end the conversation at 344. For example, if the statement is classified as a highly negative response, control may end the call at 348 and move on to another customer that may be more likely to purchase a product. If the statement is classified as less negative, or even positive, control proceeds to 352 to provide a response to the customer according to the classified positive or negative response. For example, FIG. 4 illustrates a process for supplying an audio signal response to the customer (e.g., via the audio signal response module 116, etc.), and FIG. 5 illustrates a process for determining an optimal sales pitch to provide to the customer based on a classified positive or negative response (e.g., via the optimal sales pitch designing module 118, etc.). Control then returns to 304 to receive another customer statement and again determine a customer intention from the new statement.

Although FIG. 3 illustrates performing two intention determinations according to separate keyword and NLP processes, and then using the one with the higher accuracy rate, in various implementations only one of the keyword or NLP processes may be used, other combinations of the keyword and NLP processes may be used, etc. For example, the keyword searching and matching method may be used first to classify the text signal, and then according to different classifications of the keyword searching and matching, the natural language processing algorithm may be used to obtain the final classification result of the words and sentences. Alternatively, the natural language processing algorithm may be used to first determine the customer's response, and keyword searching and matching may be used to obtain the final classification result using the output of the NLP algorithm.

In various implementations, customer responses may be divided into two main categories: negative responses and non-negative responses (or positive responses and non-positive responses). Positive responses may represent that a customer is willing to purchase products, while non-positive responses may include any other responses (such as negative responses and responses with unknown intention). Negative responses may represent that a customer is not willing to keep listening, is unavailable for the call, is not the target customer for a particular product sale, etc., while non-negative responses (including positive responses and responses of unknown intentions) may represent that the customer is willing to or is likely to keep listening.

Under different classifications, each customer response may be further divided into different conversation scenarios, according to the content of the customer response. Examples are listed in the first and second columns of Table 1 below. When the customer provides a response, the system may record it and perform a statistical calculation on the number of occurrences of different categories and scenarios, along with their time stamps, in order to use them as parameters for subsequent call content.

The product knowledge and sales pitch module 114 may design sales pitches in advance, so that the telemarketing robot may increase the willingness of customers to participate in the conversation based on the predefined sales pitches. When a call is connected, the system will start a conversation according to a preset sale conversation process (e.g., a conversation flow), which may include but is not limited to a prologue, a highlights of product(s) for sale, sales pitches for the product(s), call transfers to a human telemarketer person, a process for interpreting customer responses, etc. The preset sale conversation process may have goals of increasing a customer's purchase intention, successfully transferring the call to a salesperson for subsequent product descriptions, etc.

In the sale conversation process, the customer may respond at any time, and the language intention determining module 112 may generate a specific response message according to the category of the customer's response, the conversation scenario, the customer's attributes, etc. (see Table 1 below). For example, if a customer asks a question about the services of an insurance claim, the system can determine the question as a positive response "inquiring for claim services," and generate a response message mode according to the customer's attributes. According to the customer's responses, the response messages of the telemarketing robot may be classified on demand into, for example but not limited to, six main modes illustrated in Table 2 below.

In Table 2, each response message list includes various response messages for different scenarios and customer's attributes. Each response message mode may comprise a single response category or a combination of multiple response categories. For example, response message mode 1 may be "pointing out the risky incidences or issues," and response message mode 2 may be a combination of "agreeing or praising the customer," "describing the case," "inquiring the customer's perspective", etc. Each response message mode may correspond to a response message mode list. Each response message mode list may be a preset (e.g., prerecorded) list, and may comprise a plurality of response messages corresponding to the response message mode.

When a customer's response is received, the system 100 may determine whether to end the conversation. If the conditions of ending the conversation are met (e.g., as shown in Table 3), the system 100 may generate a conversation ending message according to different situations. For different needs, the system administrator may modify the conditions of ending conversations. For example, a system administrator may reduce a number of the negative responses required to end the call from more than 3 times to more than 2 times, to meet the current business conditions (e.g., if the system administrator does not want to force customer to provide as many negative responses before ending the call, if the system administrator wants to get through more customers in a shorter time period, etc.).

TABLE 1

| Categories of customer's responses | Conversation scenarios | Customer's attributes | Response message modes |
| --- | --- | --- | --- |
| Negative response (non-positive response) | No intention to insurance products | Attribute A | Response message mode 1 |
| | | Attribute B | Response message mode 2 |
| | Being busy and unavailable for the call | Attribute A | Response message mode 3 |
| | | Attribute B | Response message mode 4 |
| Response of unknown intention (non-positive response) | I don't get it | Attribute A | Response message mode 5 |
| | | Attribute B | Response message mode 6 |
| Positive response | . . . | . . . | . . . |
| | Inquiring services of | Attribute A | Response message |

TABLE 1-continued

| Categories of customer's responses | Conversation scenarios | Customer's attributes | Response message modes |
|---|---|---|---|
| | an insurance claim | | mode 7 |
| | | Attribute B | Response message mode 8 |
| ... | ... | ... | ... |

TABLE 2

| Categories of customer's responses | Response categories (message mode) | Examples of response messages |
|---|---|---|
| Negative response (non-positive response) | Agreeing or praising the customer | Yes, I understood. Many people has the same perspective. |
| Negative response (non-positive response) | Pointing out the risky incidences or issues | Effects to health caused by air pollution The chance of cancer in the citizens per year |
| Negative response (non-positive response) | Describing the case | The XXX incidence on TV news last month One of my customers faced the same condition yesterday |
| Negative response (non-positive response) | Describing the advantage and value of products | The key point of the warranty of this product Life-time warranty and refund for the paid insurance fees |
| Negative response, response of unknown intention (non-positive response) | Inquiring the customer's perspective | May I transfer the call to our customer manager for more detail explanation? Is it clear for this matter? |
| Response of unknown intention (non-positive response) | Otherwise repeating or inquiring | What I meant is XXX Could you have anyone else to take over? |
| Positive response | Responding directly | Our customer service line is XXXX Explaining how to get information |

TABLE 3

| Occurrences | Times of occurrences | Ending the conversation message and the subsequent actions |
|---|---|---|
| Negative response | More than three times | End conversation message 1, and hang up the phone call |
| Strong complaint from customers | More than one time | End conversation message 2, and hang up the phone call |
| Positive response | More than two times | End conversation message 1, and transfer to a real person |

Response Message Generation

FIG. 4 illustrates an example process for providing an audio signal to the customer, which may be implemented by the audio signal response module 116, etc. Control starts at 404 by receiving a selected response message from the language intention determining module 112. For example, an optimal sales pitch response may be selected (e.g., using the optimal sales pitch designing module 118, the product knowledge and sales pitch module 114, etc.) that will best address the intention of the customer as determined by the language intention determining module.

At 408, control determines whether to use a recording to play the selected message. If so, a pre-recorded audio signal of the selected response signal is obtained at 416, and the pre-recorded audio signal is output to the customer at 420. For example, a recording and playback system may be used where each response message is recorded in an audio file in advance, and each corresponding response message is generated as an audio signal to be output to the customer. After the audio signal is obtained, the audio signal is played to the customer through an interactive speech system, a computer-telephone integration system, etc., in order to simulate a real person to respond to the customer.

Alternatively, if a recoding will not be used to play the selected message to the customer, control proceeds to 412 to convert the selected response into an audio signal using voice synthesis. The voice synthesis message is then output as an audio signal to the customer at 420. For example, a computer program for voice synthesis may which converts each corresponding response message (in text format) into a synthetic audio signal in any suitable language (such as a Taiwanese-accent audio signal, etc.). The audio signal may then be played to the customer through the interactive speech system, the computer-telephone integration system, any other suitable text-to-speech system, etc., in order to simulate a real person to respond to the customer.

Optimal Sales Pitch Development

FIG. 5 illustrates an example process for developing optimal sales pitch responses to increase customer intentions to purchase a product during a call. At 504, control begins by obtaining multipole historical sales calls. For example, data recorded for a plurality of customers calls associated with the products and marketing activities may be collected and sorted in order by time, where the audio signals are converted into text data by the real-time speech recognition module 108 to obtain historical sale conversation records of the telemarketers and customers.

Control separates the obtained calls into multiple data sets according to call attributes at 508. Example attributes may include customer age and gender, call out time, call out telemarketer, product sold, etc. After identifying a call as selling a specific product, such as travel insurance, cancer insurance, personal accident insurance, etc., control may confirm that the call script is clean (e.g., not a customer service call, etc.).

The data may be separated into several groups by some attributes (e.g., age, gender, etc.), which can sharpen the training dataset, mitigate data noises, ensure that the developed model is tightly linked to a customer segment business application, etc. As an example a first dataset may include women aged 20-39, a second dataset may include women aged 40-55, a third dataset may include women older than 55, a fourth dataset may include men aged 20-39, a fifth dataset may include men aged 40-55, a sixth dataset may include men aged over 55, etc.

The datasets may be separated by customer segment attributes to increase the artificial intelligence effectiveness by using different conversations scripts for different demographics. For example, it is generally easy to acquire or capture customer general information on age and gender from an existing customer database or online product quotation form. Without the demographic information, the system 100 would only be able to use one script (per individual product) for conversations with all genders and ages. Other customer attributes may also be used, such as customer loyalty, risk level, etc.

Different customer segmentation (e.g., based on age, gender, etc.) represents different life stages of customers, and may be highly relevant to needs for certain products. For example, when selling insurance products, senior customers may be more concerned about specific diseases, while younger generations may be more price sensitive. For 3C product selling, male customers may be more interested in functionality, while female customers may be more interested in product outlooks. Separating the data into several small datasets for model training data, allows for minimizing the differences within each segments, and helps algorithm/model learn the best answers for specific segments. For example, senior customers may use more polite responses to reject product sales, while younger generations may be more likely to directly to express their emotions when rejecting a product sale.

At 512, control segments the words in each dataset to create or update product and service glossaries. A product and service glossary may be established by combining insurance terminology, service items, the product data, etc., with the content of each conversation in each phone call record. Different products or service will usually have their own proper nouns, and they may vary from time to time. In order to recognize new terminology or new responses from customer, the system 100 may capture scripts and transfer them into sentences and words every day, every week, every moth, etc.

Control generates a word-vector matrix based on the segmented word frequency at 516. For example, new words are captured periodically and a word embedding algorithm may be used to generate the word-vector matrix. As mentioned above, model performance may be optimized by updating the input training data on a regular (e.g., daily, etc.) basis. As one example, a Word2Vec algorithm may be used to generate a word-vector matrix, as shown in Table 4 below. The matrix may quantize the mathematical structure of each word, calculate correlations between different words, etc. The data dimension parameters may be set according to the type of word-vector matrix, which may be between 200 and 500 in some implementations.

TABLE 4 word-vector matrix

| Glossary | The first vector of the matrix | The second vector of the matrix | ... | The $n^{th}$ vector of the matrix |
|---|---|---|---|---|
| Cataract | 0.512674 | 0.921358 | ... | 0.001458 |
| Budget | 0.856211 | 0.301425 | ... | 0.158613 |
| Claim expense | 0.001585 | 0.125462 | ... | 0.812737 |
| ... | ... | ... | ... | ... |

At 520, control determines whether new words are to be added to the matrix, and at 524, control determines whether human review is needed to label the new words. For example, control may detect a number of new words in a new call script, and the frequency of the new words. If a number of new words reaches a threshold (e.g., more than five occurrences, etc.), a purity calculation may be performed on each sentence including the new word. If the purity is less than a specified ratio (e.g., less than 0.7, etc.), control may require a human to identify a label for the new word at 528. Otherwise, the system 100 may automatically classify the new words with a pre-defined label at 532. In addition to the purity calculation, if the new word frequency is above a threshold (e.g., a frequency of 30 occurrences, etc.), control may ask a human to identify the label at 528.

As an example of online health insurance product sales, if a customer sentence is "Does it also cover Coronavirus?" and control identifies "Coronavirus" as the only unknown word, the sentence purity may be calculated as $4/5=0.8$ (indicating that eighty percent of the words in the sentence are known). If the word "Coronavirus" occurred in 131 sentences, and 131 is greater than a new word frequency of 30, control may ask a human user to identify a label for the word "Coronavirus".

As another example of conversation labeling, the meaning of each unknown conversation content of the call may be labeled with an annotation, as shown in Table 5 below. One conversation label may equivalent to one of the conversation scenarios shown in Table 1, and the labeling may allow for classifying each conversation for subsequent analysis.

TABLE 5

| Customer number | Conversation order | Conversation content | Conversation label (conversation scenario) |
|---|---|---|---|
| C121 | 1 | Hello, is this Mr. XX? This is XX Life Insurance company speaking. | Prologue - show your identity |
| C121 | 2 | Insurance? I don't need it. | Immediate rejection by customers |
| C121 | 3 | It will only take one minute, here is a simple explanation for you | Prologue - response to immediate rejection by customers |
| ... | ... | ... | ... |

In order for each conversation to correspond to an appropriate conversation label (conversation scenario), a conversation label set that covers all sales terms and customer responses may be established. According to the result of the word-vector matrix generated at 516, a clustering analysis may be performed on the word-vector matrix, which may classify the words with similar meaning and similar incidence into a same word cluster. Each word cluster can be given a suitable conversation label after manual interpretation, as shown in Table 5 above. Thus, the conversation label set including respective conversation words can be obtained. Different conversation label sets (conversation scenarios) may be obtained continuously, for different sale products and continuously updated analysis data.

According to the attributes of the conversation labels, the speaker can be labeled as a customer or a telemarketer, and then the label can be classified. Further, different conversation labels and the data of the same call can be integrated to obtain conversation time periods corresponding to the conversation labels.

TABLE 6

| Conversation label set (conversation scenario) | | |
|---|---|---|
| Index of word clusters | Words with similar meaning and similar incidence | Conversation label (conversation scenario) |
| 1 | But I, Thank you, That's it, I don't need it really, I don't need it . . . indeed don't, But because, No . . . no, I don't need it now, . . . | Immediate rejection by customers |
| 2 | Cataract, Hip joint, | Features of products- |

TABLE 6-continued

Conversation label set (conversation scenario)

| Index of word clusters | Words with similar meaning and similar incidence | Conversation label (conversation scenario) |
|---|---|---|
| 3 | Knee joint, Bump, Bone, Artificial, Mechanical, Hypertension, Cecum, Hemorrhoids, Crystalline lens, Heart support, Gallstone, Kidney stone, Appendicitis, Sinusitis, Chalazion, Hordeolum, . . . | medical treat/medical equipment |
|  | Compensation, Subsidy, Application, Within days, Pay, Cash, Claim expense, Extra subsidy, Certificate, diagnosis, . . . | Description of a claim method |
| . . . | . . . | . . . |

For example, a wording analysis is shown in Table 7 below. A customer's attribute and a salesperson response message may be filled in under each conversation label (conversation scenario), along with an indication of a customer's purchase intention. An objective basis for evaluating the customer's purchase intention that may be calculated by a statistical calculation on qualitative and quantitative measurement indicators under different response messages. In addition, using various kinds of wording analysis techniques (e.g., word segmentation, keyword searching and matching, natural language analysis, word-vector matrices, word cluster analysis, labeling, etc.), the salesperson's response message can also be classified into a response mode label which comprises one or more message modes shown for example in Table 2. The salesperson's response messages to the same customer may be labeled with a response mode label which comprises one or more response modes. For example, each salesperson's response message may be attached with a response mode label, and the response mode label may be configured to indicate the response message mode corresponding to the salesperson's response message, to establish a correlation between the salesperson's response message and the response message mode.

In some implementations, the indication of the customer's purchase intention may be determined according to the length of the conversation, to establish the correlations between different conversation labels and different purchase intentions. The shorter the conversation time period is, the lower the customer's purchase intention indicator may be. On the contrary, if the conversation time period is longer, the customer's purchase intention indicator may be higher. In some implementations, the indication of the customer's purchase intention may be calculated according to qualitative measurement indicators and quantitative measurement indicators to objectively evaluate the customer's purchase intention.

The qualitative measurement indicator may be defined by comparing the customer's response with a preset wording database (for example, comprising the keywords which are related to impatient emotions, questioning emotions, complaints, etc.), and thereby determining whether the customer has impatient emotion, questioning emotion, complaint behavior, etc. Example, qualitative measurement indicators may include whether the customer responds with impatient-emotion words (e.g., never call me again), whether the customer responds with questioning-emotion words (e.g., how did you get my phone number), that the customer intends to make a complaint to the competent authority (e.g., I want to make a complaint to the Financial Management Association), etc.

Example quantitative measurement indicators may include a whole time period of the call, whether the customer has closed a deal, remaining time period after the response, the number of receiving negative rejections within a certain period of time (e.g., be rejected three times within one minute), etc.

Taking the remaining time period as an example, as the remaining time period increases, it represents that the response has increased the customer's attention to follow the subsequent conversation, and thus increased the customer's purchase intention. By sorting these remaining time periods and choosing the response with the longest remaining time period, an optimal response message suitable for the specific customer's attribute can be obtained in a specific conversation scenario, and thus a database of the product knowledge and sales pitch module 114 can be established (e.g., as shown in Table 1 and Table 2).

The weights of the above-mentioned qualitative measurement indicators and/or quantitative measurement indicators may be set, and the indicator of customer's purchase intention indicator may be calculated according to the preset weights so as to objectively evaluate the customer's purchase intentions under various response message modes.

TABLE 7 remaining conversation time periods according to response message

| Calling party | Categories of conversation labels | Conversation labels (conversation scenarios) | Customer's attributes | Response message modes | Indicators of customer's purchase intention (e.g., average remaining conversation time periods (sec)) |
|---|---|---|---|---|---|
| Customer | Negative response | I already have the insurance | Attributes A | Response message mode A1 | 162.21 |
|  |  |  |  | Response message mode A2 | 124.15 |
| . . . | . . . | . . . | Attributes B | Response message | 385.95 |

TABLE 7-continued remaining conversation time periods according to response message

| Calling party | Categories of conversation labels | Conversation labels (conversation scenarios) | Customer's attributes | Response message modes | Indicators of customer's purchase intention (e.g., average remaining conversation time periods (sec)) |
|---|---|---|---|---|---|
| | | | | mode B1 Response message mode B2 | 175.30 |
| ... | ... | ... | ... | ... | ... |

Referring again to FIG. 5, at 536 control determines successes of sales pitch responses to customer statements with different labels. The identified success rates may be determined using any suitable approach, such as the example processes described above. Control may then train a machine-learning model to optimize sales pitch responses for different labels in each dataset, based on the success rate of the historical sales pitch responses and the label classifications, at 540. As mentioned above, control may obtain additional historical sales calls at 544, on a periodic basis such as every day, every week, etc. Control may then proceed back to separating the newly obtained calls into multiple datasets by attributes at 508, to update the trained model using the new call data.

Although the examples above are described with reference to the insurance-related industry, in other implementations the system 100 could be applied to industries, environments, etc., other than insurance.

CONCLUSION

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. The phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A. The term subset does not necessarily require a proper subset. In other words, a first subset of a first set may be coextensive with (equal to) the first set.

In this application, including the definitions below, the term "module" or the term "controller" may be replaced with the term "circuit." The term "module" may refer to, be part of, or include processor hardware (shared, dedicated, or group) that executes code and memory hardware (shared, dedicated, or group) that stores code executed by the processor hardware.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are IEEE Standard 802.15.4 (including the ZIGBEE standard from the ZigBee Alliance) and, from the Bluetooth Special Interest Group (SIG), the BLUETOOTH wireless networking standard (including Core Specification versions 3.0, 4.0, 4.1, 4.2, 5.0, and 5.1 from the Bluetooth SIG).

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A robotic telemarketing system, comprising:
a telephone device configured to receive a called party message from a called party, and transmit a response message to the called party to respond to the called party message; and
a computer device electrically connected to the telephone device and configured to:
determine an objective label corresponding to the called party message from a plurality of preset labels by analyzing the called party message;
determine an objective response mode corresponding to the objective label;
generate the response message according to the objective response mode;
store a plurality of historical communication records, wherein each of the plurality of historical communication records comprises a historical called party message and a historical response message;
tag each of the plurality of historical called party messages with a preset label by analyzing the plurality of historical called party messages;
determine an original response mode of each of the plurality of historical response messages by analyzing the plurality of historical response messages; and
for each of the plurality of preset labels, calculate a measurement indicator for each corresponding original response mode, and select one of the corresponding original response modes having the greatest measurement indicator as the objective response mode for the preset label, wherein the computer device is configured to calculate each measurement indicator according to a remaining time after sending a historical response message in a historical communication.

2. The robotic telemarketing system of claim 1, wherein the computer device is further configured to identify an intention of purchasing a product by the called party by analyzing the called party message, and the plurality of preset labels correspond to the intention of purchasing a product by the called party.

3. The robotic telemarketing system of claim 2, wherein the intention of purchasing a product by the called party is a non-positive intention.

4. The robotic telemarketing system of claim 1, wherein the computer device is configured to determine the objective response mode corresponding to the called party message according to both the objective label and attributes of the called party.

5. The robotic telemarketing system of claim 1, the computer device is further configured to, for each of the plurality of preset labels, calculate the measurement indicators and select the one with the greatest measurement indicator as the objective response mode according to different preset called party attributes.

6. The robotic telemarketing system of claim 1, wherein in addition to the remaining time after sending a historical response message in a historical communication, the computer device is configured to calculate the measurement indicators according to at least one of the following factors: a whole time of a historical communication, a result of a historical communication, and a number of messages of non-positive intention of purchasing a product in a historical communication.

7. The robotic telemarketing system of claim 1, wherein each of the plurality of original response modes comprises one or a combination of the following response categories: a supporting category, a rebutting category, an explaining category, an answering category, and a questioning category.

8. A computer device for a robotic telemarketing system, the computer device comprising:
 a communication interface configured to receive a called party message from a telephone device, and transmit a response message to the telephone device to respond to the called party message; and
 a processor electrically connected to the communication interface and configured to:
  determine an objective label corresponding to the called party message from a plurality of preset labels by analyzing the called party message;
  determine an objective response mode corresponding to the objective label;
  generate the response message according to the objective response mode;
  store a plurality of historical communication records, wherein each of the plurality of historical communication records comprises a historical called party message and a historical response message;
  tag each of the plurality of historical called party messages with a preset label by analyzing the plurality of historical called party messages;
  determine an original response mode of each of the plurality of historical response messages by analyzing the plurality of historical response messages; and
  for each of the plurality of preset labels, calculate a measurement indicator for each corresponding original response mode, and select one of the corresponding original response modes having the greatest measurement indicator as the objective response mode for the preset label, wherein the processor is configured to calculate each measurement indicator according to a remaining time after sending a historical response message in a historical communication.

9. The computer device of claim 8, wherein the processor is further configured to identify an intention of purchasing a product by a called party by analyzing the called party message, and the plurality of preset labels correspond to the intention of purchasing a product by the called party.

10. The computer device of claim 9, wherein the intention of purchasing a product by the called party is a non-positive intention.

11. The computer device of claim 8, wherein the processor is configured to determine the objective response mode corresponding to the called party message according to both the objective label and attributes of the called party.

12. The computer device of claim 8, wherein the processor is further configured to, for each of the plurality of preset labels, calculate the measurement indicators and select the one with the greatest measurement indicator as the objective response mode according to different preset called party attributes.

13. The computer device of claim 8, wherein in addition to the remaining time after sending a historical response message in a historical communication, the processor is configured to calculate the measurement indicators according to at least one of the following factors: a whole time of a historical communication, a result of a historical communication, and a number of messages of non-positive intention of purchasing a product in a historical communication.

14. The computer device of claim 8, wherein each of the plurality of original response modes comprises one or a combination of the following response categories: a supporting category, a rebutting category, an explaining category, an answering category, and a questioning category.

15. A method for generating a response message for a robotic telemarketing system, the method comprising:
 receiving, by a telephone device, a called party message from a called party;
 determining, by a computer device, an objective label corresponding to the called party message from a plurality of preset labels by analyzing the called party message;
 determining, by the computer device, an objective response mode corresponding to the objective label;
 generating, by the computer device, the response message according to the objective response mode;
 transmitting, by the telephone device, the response message to the called party to respond to the called party message;
 storing, by the computer device, a plurality of historical communication records, wherein each of the plurality of historical communication records comprises a historical called party message and a historical response message;
 tagging, by the computer device, each of the plurality of historical called party messages with a preset label by analyzing the plurality of historical called party messages;
 determining, by the computer device, an original response mode of each of the plurality of historical response messages by analyzing the plurality of historical response messages; and
 for each of the plurality of preset labels, calculating a measurement indicator for each corresponding original response mode, and select one of the corresponding original response modes having the greatest measurement indicator as the objective response mode for the preset label, wherein the computer device is configured to calculate each measurement indicator according to a remaining time after sending a historical response message in a historical communication.

16. The method of claim 15, further comprising identifying, by the computer device, an intention of purchasing a product by the called party by analyzing the called party message, wherein the plurality of preset labels correspond to the intention of purchasing a product by the called party.

17. The method of claim 16, wherein the intention of purchasing a product by the called party is a non-positive intention.

18. The method of claim 15, wherein the determining the objective response mode incudes determining the objective response mode corresponding to the called party message according to both the objective label and attributes of the called party.

19. The method of claim 15, further comprising, for each of the plurality of preset labels, calculating the measurement indicators and selecting the one with the greatest measurement indicator as the objective response mode according to different preset called party attributes.

20. The method of claim 15, wherein in addition to the remaining time after sending a historical response message in a historical communication, the calculating includes calculating the measurement indicators according to at least one of the following factors: a whole time of a historical communication, a result of a historical communication, and a number of messages of non-positive intention of purchasing a product in a historical communication.

21. The method of claim 15, wherein each of the plurality of original response modes comprises one or a combination of the following response categories: a supporting category, a rebutting category, an explaining category, an answering category, and a questioning category.

* * * * *